Aug. 11, 1931.                A. W. CAPS                 1,818,461
                          PHOTOGRAPHIC CAMERA
                          Filed Feb. 20, 1928

INVENTOR
Arthur W. Caps
BY
Crumpton & Griffith
his ATTORNEYS

Patented Aug. 11, 1931

1,818,461

UNITED STATES PATENT OFFICE

ARTHUR W. CAPS, OF ROCHESTER, NEW YORK, ASSIGNOR TO PHOTOSTAT CORPORATION, OF PROVIDENCE, RHODE ISLAND, A CORPORATION OF RHODE ISLAND

PHOTOGRAPHIC CAMERA

Application filed February 20, 1928. Serial No. 255,786.

This invention relates to photographic apparatus and more particularly to commercial copying cameras, and is directed in part toward providing a lens mounting of simple construction and especially one which safeguards the lens and any prism which may be attached thereto against accidental dropping while the usual attaching means is being manipulated to attach or detach the lens to or from the camera.

To these and other ends the invention resides in certain improvements and combinations of parts, all as will be hereinafter more fully described, the novel features being pointed out in the claims at the end of the specification.

In the drawings.

Similar reference numerals throughout the several views indicate the same parts.

Figure 1:
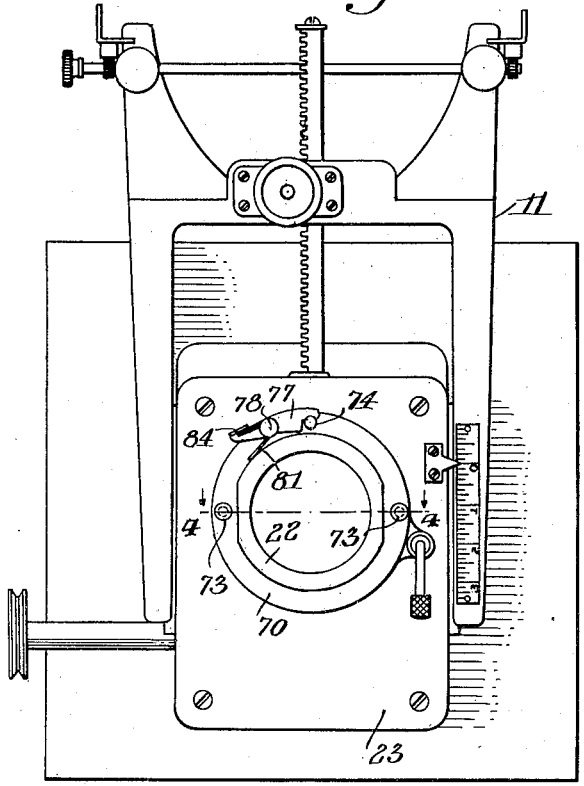
Fig. 1 is a front view, on an enlarged scale, of the adjustable lens board.

This application is a continuation in part of my application, Serial No. 38,844, filed June 22, 1925, for photographic copying machines.

The present embodiment of the invention provides a simple and durable construction for a camera lens mounting element which enables the operator to readily position the lens in the proper centering relation to the exposed area of the sensitized material and which also permits of easy and rapid removal and replacement of the lens from the machine so that it may be disposed in a safe place when the machine is not being used and is not apt to be dropped in the process of reapplying it.

The present embodiment of the invention relates in general to cameras, and more particularly to so-called copying cameras in which a prism is ordinarily employed in conjunction with a lens, to bend the rays of light in known manner. Ordinarily the prism is attached to the lens casing or mounting. The prism and lens are among the most valuable and expensive parts of a camera of this type, and it is the practice of some users of such cameras to remove the prism and lens each night and place them in a safe or elsewhere for safe keeping, so that they will not be stolen if the establishment is broken into during the night and so that they cannot be injured by persons cleaning the premises after the usual hours of business.

Heretofore, the lens (and the prism attached thereto when such a prism is used) has been usually secured to the camera front or other suitable part of the camera simply by screws, nuts, or the like. Mistakes are sometimes made in judging exactly when the threads of a screw or nut are properly engaged with the cooperating threads or have become completely disengaged therefrom, and it is apparent that there is considerable danger of dropping the lens when attaching or detaching it by relying on the supposed engagement of threads when in fact they are not engaged. Furthermore, it is convenient, efficient, and a great saving in time to have means which may be operated instantly to hold the lens and prism in place in order to leave both hands free to manipulate the screws, nuts, or other usual attaching means.

To this end, the present invention provides supplementary securing or latching means for holding the lens mounting in place while the usual securing means is being manipulated either to attach or detach the lens mounting. Referring to the drawings there is shown a frame element 11 which may be secured to the camera in any suitable manner, and on which is mounted a member having a cover plate 23, which may be described as a lens board. The lens tube or mounting is shown at 22 and carries the usual lens secured therein in any suitable manner. Where this arrangement is used in connection with a commercial copying camera employing a prism, the prism may be secured in any suitable manner to this lens tube or mounting 22.

Figure 2:
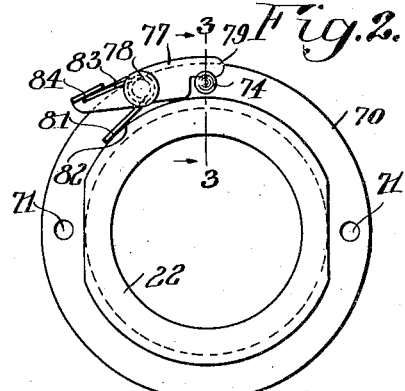
Fig. 2 is a detail front view of the lens tube removed from the lens board.
Figure 4:
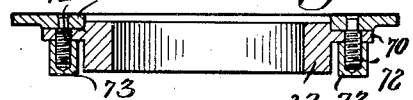
Fig. 4 is a sectional view taken on line 4—4 of Fig. 1.

The lens tube is detachably connected to the cover plate 23 so that it may be easily removed when desired, as above mentioned. For this purpose, the lens tube is formed with a sleeve portion 68 adapted to fit within an opening 69 in the cover plate. At an intermediate portion on the lens tube 22 there is formed a flange 70 adapted to fit against a face of the cover plate, as best seen in Fig. 4. The flange 70 is provided with a pair of apertures 71 as shown in Figs. 2 and 4, which are adapted to receive therethrough a pair of stud bolts 72 suitably fixed in and projecting from the face of the cover plate 23, as shown in Fig. 4. Each of the stud bolts 72 has a threaded cap 73 adapted to be screwed thereon to bear against the flange 70 to hold the same in contact with the face of the cover plate 23.

Figure 3:
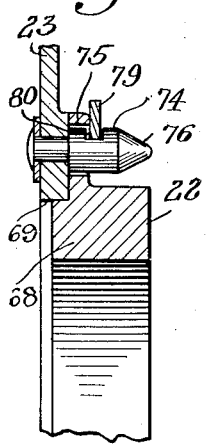
Fig. 3 is a detailed sectional view taken on line 3—3 of Fig. 2.

In assembling the lens tube carrying the lens and prism thereon, into position on the cover plate 23, it has been found desirable to provide auxiliary means for holding the tube securely in place while the operator is placing the threaded caps on to the bolts 72, for the reasons above explained. For this purpose there is provided on the cover plate 23 an outwardly extending pin 74 which projects through an opening 75 in the flange 70 when the tube is in place against the cover plate. The pin 74 is formed with a tapered end 76 to facilitate the passage of the pin through the opening 75. A latch member 77 is pivotally mounted as at 78 upon the flange 70 of the lens tube and has an end portion 79 adapted to engage within a notch 80 in the pin 74, as best shown in Fig. 3. The sides of the notch thus provide abutments to prevent the movement of the lens tube away from the plate 23 when the end of the latch is engaged in the notch. The tapered end portion 76 of the pin serves to facilitate lifting of the end of the latch when the lens tube is moved into position and the latch will subsequently snap into position within the notch 80 when the tube is in its proper place.

The end of the latch is yieldingly urged in a direction to engage within the notch 80 by means of a spring 81 which is coiled one or more times about the pivot pin 78 of the latch and has outwardly extending arms 82 and 83 engaging respectively the forward extending portion of the lens tube and a projecting tail piece 84 on the latch 77, as best shown in Fig. 2

After the operator has finished using the camera for the day he may find it desirable to remove the lens system and deposit it in a safe place to prevent theft thereof. The operator first removes the threaded caps 73 from the stud bolts 72, after which the end of the latch 77 is released from the notch 80 by downward pressure on the tail piece 84 while the operator holds the lens tube securely with his free hand. Thus the danger of the lens tube falling upon the glass plate of the copyholder with consequent injury to the copyholder and to the lens and prism, as well, is avoided.

The lens tube is replaced in position in a reverse manner, the opening of the flange 70 is moved over the pin 74 and end of the latch rides up over the tapered end 76 and snaps into the notch 80 and thus holds the lens tube securely in place, enabling the operator to attach the threaded caps 73 on to the bolts 72 without the need of any undue precautions in this latter operation.

The invention thus provides an efficient and durable form of construction for the lens mounting element combined with means for easily detaching the lens system.

As many possible embodiments of the invention herein disclosed may be constructed without departing from the spirit of the invention, it is to be understood that all matter hereinbefore set forth or shown in the accompanying drawings is to be interpreted as illustrative and not in a limiting sense.

I claim as my invention:

1. In a photographic copying machine, the combination of a lens board member, a lens tube member associated therewith, means for securing said lens tube member on said lens board member, and cooperating latch means comprising a stud on one of said members, an abutment on said stud, and a latch on the other of said members for engaging said abutment to hold said members in cooperating relation to each other while said securing means is being manipulated.

2. In a photographic copying machine, the combination with a lens board and a lens tube associated therewith, of means for securing said lens tube on said lens board, and auxiliary latching means for securing said lens tube in a preliminary manner on said lens board while said first mentioned securing means are being manipulated.

3. In a photographic copying machine, the combination of a lens board having an aperture therein, a lens tube having a portion fitting within said aperture, a flange on said lens tube engaging said lens board at the side of said aperture, said flange being provided with an opening, a member on said lens board projecting through said opening and provided with abutment means, a yieldingly mounted latch on said flange adapted to engage said abutment means to hold said lens tube in position on said lens board.

ARTHUR W. CAPS.